(12) United States Patent
Miyahara et al.

(10) Patent No.: US 7,670,431 B2
(45) Date of Patent: Mar. 2, 2010

(54) CARBON NANOTUBE MANUFACTURING APPARATUS AND METHOD, AND GAS DECOMPOSER FOR USE IN THE MANUFACTURING APPARATUS AND METHOD

(75) Inventors: Tomoko Miyahara, Nakai-machi (JP); Kazunori Anazawa, Nakai-machi (JP); Hiroyuki Watanabe, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1258 days.

(21) Appl. No.: 10/768,153

(22) Filed: Feb. 2, 2004

(65) Prior Publication Data

US 2005/0061249 A1 Mar. 24, 2005

(30) Foreign Application Priority Data

Sep. 22, 2003 (JP) .............................. 2003-329875

(51) Int. Cl.
C23C 16/00 (2006.01)
C23C 16/02 (2006.01)
C23C 16/26 (2006.01)

(52) U.S. Cl. ...................................... 118/715; 118/722

(58) Field of Classification Search ................. 118/715, 118/722
See application file for complete search history.

(56) References Cited

U.S. PATENT DOCUMENTS 5,702,532 A * 12/1997 Wen et al. .................... 118/730
6,730,284 B2 * 5/2004 Harutyunyan et al. ..... 423/447.3
6,967,013 B2 * 11/2005 Someya et al. ........... 423/447.3
7,135,159 B2 * 11/2006 Shaffer et al. ............ 423/447.3
2001/0053344 A1 * 12/2001 Harutyunyan et al. ... 423/445 R
2003/0147801 A1 * 8/2003 Someya et al. ........... 423/447.3
2003/0211029 A1 * 11/2003 Someya et al. ........... 423/447.3
2005/0061249 A1 * 3/2005 Miyahara et al. ............ 118/722
2005/0163696 A1 * 7/2005 Uhm et al. .............. 423/445 B
2005/0170089 A1 * 8/2005 Lashmore et al. ......... 427/248.1

FOREIGN PATENT DOCUMENTS

| EP | 1 061 041 | 12/2000 |
| EP | 1 061 043 | 12/2000 |
| JP | A-04-334328 | 11/1992 |
| JP | A-2002-274965 | 9/2002 |
| JP | 2003-313017 A | * 11/2003 |

OTHER PUBLICATIONS

Maruyama et al., "Low-Temperature synthesis of high-purity single-walled carbon nanotubes from alcohol," Chemical Physics Letters 360, pp. 229-234, Jul. 10, 2002.

* cited by examiner

Primary Examiner—Jeffrie R Lund
(74) Attorney, Agent, or Firm—Oliff & Berridge, PLC

(57) ABSTRACT

A gas decomposer formed from a porous material to decompose a carbon-containing raw material carried on a gas flow and to synthesize a carbon nanotube from the decomposed carbon-containing raw material is provided as a member suitable for use in carbon nanotube manufacture that offers a user a choice of using, or not using, a metal catalyst according to the user's need in vapor phase growth, which allows successive operation and which is therefore fit for mass production. Also provided are carbon nanotube manufacturing apparatus and method which use the gas decomposer.

32 Claims, 11 Drawing Sheets

CARBON NANOTUBE MANUFACTURING APPARATUS AND METHOD, AND GAS DECOMPOSER FOR USE IN THE MANUFACTURING APPARATUS AND METHOD

FIELD OF THE INVENTION AND RELATED ART STATEMENT

The present invention relates to carbon nanotube manufacturing apparatus and method, particularly, carbon nanotube manufacturing apparatus and method capable of collecting carbon nanotubes more efficiently while employing vapor phase growth, which is high in manufacturing efficiency, and also relates to a member (gas decomposer) suitable for use in the manufacturing apparatus and method.

Carbon structures represented by carbon nanotubes and fullerenes are lately being considered for applications in various fields because of their small sizes and unique properties. Carbon nanotubes, in particular, are a subject of many studies which try to put carbon nanotubes into practical use as emitters for field emission displays, as field effect transistors, as probes for scanning probe microscopes, as negative electrodes of lithium secondary batteries, and as various composite materials.

While those attempts to develop carbon nanotube applications are being made, no technique has succeeded in manufacturing carbon nanotubes stably and efficiently. In order to advance practical applications of carbon nanotubes, it is indispensable to develop a technique for manufacturing carbon nanotubes in large quantities at low cost.

Typical carbon nanotube manufacturing methods, namely, arc discharge, laser evaporation, and vapor phase growth, are described below.

To manufacture carbon nanotubes through arc discharge, carbon is evaporated by arc discharge that takes place between two graphite rods set 1 to 2 mm apart from each other. This method is capable of manufacturing carbon nanotubes with few defects in molecule structure, but does not allow successive operation and therefore is low in productivity.

To manufacture carbon nanotubes through laser evaporation, graphite that contains metal catalyst is put in an electric furnace heated to 1200° C. and is irradiated with a laser while introducing argon gas flow into the furnace, thus evaporating the graphite and depositing carbon nanotubes on an inner wall of the electric furnace. This method is suitable for manufacturing single-wall carbon nanotubes of high purity, but is low in productivity because of the methods small yield and inability to allow successive operation.

Vapor phase growth is capable of successive operation and therefore is deemed as most suitable for mass production of carbon nanotubes. There are several known methods to manufacture carbon nanotubes through vapor phase growth. To give specific examples, one method manufactures carbon nanotubes by injecting metal fine particles, which serve as catalysts, along with hydrocarbon gas, into an electric furnace where the temperature is set to 600 to 1000° C. Another method includes putting a substrate to which a metal catalyst is fixed in an electric furnace, and introducing a hydrocarbon gas flow onto the substrate to let carbon nanotubes grow on a surface of the substrate. Still another method manufactures carbon nanotubes by injecting mixture gas of hydrocarbon gas and an organic metal compound into a heating furnace and utilizing a metal catalyst that is generated as the organic metal compound is decomposed.

These vapor phase growth methods are capable of successive operation and therefore high in productivity. However, carbon nanotubes manufactured by any of these methods contains metal catalyst. This is not a problem if the use of the carbon nanotube is one that is not affected by the remaining metal catalyst or is one that positively needs the metal catalyst. On the other hand, in the case where the metal catalyst acts as an impurity, a step of removing the metal catalyst is necessary. Usually, a metal catalyst contained in a carbon nanotube is covered with amorphous carbon or is held inside the carbon nanotube. For that reason, removal of the metal catalyst requires centrifugal separation, Soxhlet extraction, annealing, acid treatment, or the like, and is very laborious. Furthermore, such treatment damages carbon nanotubes seriously and, if a metal catalyst is to be removed completely from a carbon nanotube, the final carbon nanotube yield could be dropped down to a few %.

Another problem of the above vapor phase growth methods is that it is difficult to collect carbon nanotubes deposited on the inner wall surface of the reaction chamber inside the electric furnace.

SUMMARY OF THE INVENTION

The present invention has been made in view of the above circumstances, and provides novel carbon nanotube manufacturing apparatus and method that offer a user a choice of using, or not using, a metal catalyst according to the user's need in vapor phase growth, whose structure allows successive operation and which is therefore more suitable for mass production than any other known carbon nanotube manufacturing method. The present invention also provides a member (gas decomposer) suitable for use in the manufacturing apparatus and method.

The above-mentioned carbon nanotube manufacturing apparatus and method are attained by the present invention as described below. That is, a carbon nanotube manufacturing apparatus according to the present invention includes:

a reaction tube in which a carbon nanotube is grown by vapor phase growth;

a gas supplying pipe that supplies a carbon-containing raw material carried on a gas flow to an interior of the reaction tube;

a heating unit that heats the interior of the reaction tube;

a gas decomposer that is placed in the reaction tube to decompose the carbon-containing raw material upon contact with the gas flow; and a synthesizing portion that is placed in the reaction tube and continuously supplied with the decomposed carbon-containing raw material, which has been carried on the gas flow to an outside of the gas decomposer, to synthesize a carbon nanotube.

In vapor phase growth, usually the growth of carbon nanotubes starts from a metal catalyst, which provides a place for a vapor phase reaction and which serves as a starting point of carbon nanotube growth. On the other hand, the carbon nanotube manufacturing apparatus of the present invention prepares two separate places for decomposition and growth by giving the gas decomposer a function of decomposing a carbon-containing raw material whereas growing carbon nanotubes in the synthesizing portion to which the carbon-containing raw material, which has been decomposed and carried on a gas flow to the outside of the gas decomposer, is supplied continuously. This way the apparatus can continuously supply the synthesizing portion with the decomposed carbon-containing raw-material for synthesizing carbon nanotubes and can continuously produce carbon nanotubes irrespective of whether a metal catalyst is used or not. In short, the carbon nanotube manufacturing apparatus of the present invention can be run in succession without using a metal catalyst and, since there is no metal catalyst to be removed from obtained carbon nanotubes, and nothing impairs high productivity of the apparatus.

If a metal catalyst is placed on a substrate to decompose gas together with the gas decomposer, merits of the metal catalyst (including the effect of specifying a carbon nanotube growth point and the effect of decomposing gas to synthesize carbon nanotubes) improve the productivity of the apparatus even more.

A decomposed carbon-containing raw material here means a carbon structure that is a constituent of a carbon nanotube to be synthesized, and is considered to be a single carbon atom or a cluster of plural carbon atoms. However, the mechanism of carbon nanotube growth through vapor phase growth, or any other method for that matter, is yet to be explained and it is therefore difficult to specify the exact constitution of the carbon structure. Accordingly, an altered carbon-containing raw material that is carried on a gas flow and comes into contact with the gas decomposer to create carbon nanotubes through continuous supply of this gas flow, is called a decomposed carbon-containing raw material.

No particular limitation is put on the gas decomposer as long as it has an action of decomposing a carbon-containing raw material into a state capable of synthesizing carbon nanotubes when a gas flow carrying the carbon-containing raw material is brought into contact with the gas decomposer and then supplied to the synthesizing portion continuously. Desirably, the gas decomposer is a porous material that has an action of decomposing a carbon-containing raw material and, more desirably, a porous material formed from a metal oxide material or from a carbon material.

The synthesizing portion is preferably a substrate or two or more substrates. When the synthesizing portion is composed of two or more substrates, it is preferable to arrange the substrates approximately parallel to one another since this way a decomposed carbon-containing raw material can be utilized more efficiently and the production efficiency is accordingly improved.

To give examples of more specific structure of the carbon nanotube manufacturing apparatus of the present invention, the apparatus can take the following Modes (1) through (3).

(1) The gas decomposer is placed on a surface of a substrate that serves as the synthesizing portion.

(2) The gas supplying pipe is extended to the interior of the reaction tube so that a releasing port of the gas flow is positioned inside the reaction tube, and the gas decomposer is placed in the gas supplying pipe in a manner that allows the gas decomposer to have contact with the flow of gas supplied.

It is preferable in Mode (2) to provide an auxiliary heating unit that serves to heat the gas decomposer in the vicinity of the gas decomposer in the gas supplying pipe. The gas decomposer is, for example, an aggregation of a granular porous material, preferably, an aggregation of a granular porous material formed from a metal oxide material and from a carbon material.

In an example of more specific structure of Mode (2), the synthesizing portion is placed in the vicinity of the gas flow releasing port of the gas supplying pipe. In this case, the synthesizing portion is desirably a substrate or two or more substrates, and it is more desirable to set at least one of the substrates serving as the synthesizing portion perpendicular to or at an angle to the direction of the flow of the gas released from the releasing port in the gas supplying pipe.

(3) The gas decomposer is placed on the entirety of, or a part of, an inner wall of the reaction tube, and the synthesizing portion is placed on a surface of the gas decomposer.

Roughly speaking, Mode (3) can take two modes.

One mode is to place the synthesizing portion on the inside surface of the gas decomposer (in other words, the surface opposite to the one that faces the reaction tube) in order to collect synthesized carbon nanotubes by taking the synthesizing portion out of the reaction tube. In this case, of the reaction tube, the gas decomposer, and the synthesizing portion, the reaction tube is the outermost part and the synthesizing portion is the innermost part with the gas decomposer interposed between the two.

The other mode is to make an inner wall of the reaction tube double as the synthesizing portion and place the inner wall of the reaction tube which serves as the synthesizing portion on the outside surface of the gas decomposer (in other words, the surface that faces the reaction tube) in order to collect synthesized carbon nanotubes from the inner wall of the reaction tube. In this case, of the reaction tube and the gas decomposer, the reaction tube is the outer part with its inner wall serving as the synthesizing portion and the gas decomposer is the inner part.

Desirably, the former mode of Mode (3) is designed such that a gas flow to be led into the reaction tube reaches the gas decomposer first. For the latter mode of Mode (3), it is preferable to interpose the gas decomposer between the gas flow releasing port of the gas supplying pipe and the synthesizing portion. Accordingly, it is preferable to place a discharge port, through which the gas flow is ultimately discharged to the outside of the reaction tube, on a part of the inner wall of the reaction tube that is in contact with the gas decomposer. In this way the gas flow is supplied to the gas decomposer efficiently. The latter mode may be modified as follows to synthesize carbon nanotubes more efficiently:

(i) Discharge ports as the one described above may be added to supply the gas flow on a wider area of the gas decomposer in a concentrated manner and to thereby improve the carbon nanotube production efficiency.

(ii) The diameter of the releasing port or of the discharge port is adjusted to adjust the flow rate of the gas flow.

(iii) The shape of the releasing port or of the discharge port is changed to control the direction of the gas flow.

(iv) The releasing port or the discharge port is branched to control the direction of the gas flow.

The gas flow direction can also be changed by other methods than (iii) and (iv). The releasing port of the gas supplying pipe may be modified in shape and structure as these modifications.

The reaction tube and the gas supplying pipe are not necessarily be cylindrical and may have other shapes as long as carbon nanotubes can be produced by vapor phase growth in accordance with the present invention. The reaction tube, in particular, has no structural limitations if the reaction tube is capable of letting a gas flow in and out.

It is also possible for the carbon nanotube manufacturing apparatus of the present invention to put a metal catalyst in the synthesizing portion and enjoy the merits of the use of a metal catalyst. The merits of the use of a metal catalyst are, for example, that a carbon nanotube growth point can be specified in the synthesizing portion by the metal catalyst used and, if the metal catalyst has an action of decomposing a carbon raw material used, that the conventional carbon nanotube growth by a metal catalyst takes place in conjunction with carbon nanotube growth from a decomposed carbon material supplied from the gas decomposer thereby improving the production efficiency. Alternatively, the effects of using a metal catalyst are obtained by employing as the synthesizing portion a substrate that is formed from a material containing a metal catalyst.

In the carbon nanotube manufacturing apparatus of the present invention, the heating unit may be a heating furnace and, in this case, the reaction tube is placed inside the heating furnace.

On the other hand, a carbon nanotube manufacturing method according to the present invention includes:

decomposing a carbon-containing raw material carried on a gas flow by bringing the gas flow into contact with a heated gas decomposer; and synthesizing a carbon nanotube on a synthesizing portion by continuously supplying the decomposed carbon-containing raw material carried on the gas flow to an outside of the gas decomposer to the synthesizing portion.

As has been described, the carbon nanotube manufacturing method of the present invention assigns the function of decomposing a carbon-containing raw material to the gas decomposer and synthesis of carbon nanotubes to the synthesizing portion. The carbon-containing raw material decomposed by the gas decomposer is carried on a gas flow to the outside of the gas decomposer and is continuously supplied to the synthesizing portion to synthesize carbon nanotubes on the synthesizing portion. In short, decomposition and synthesis occur in separate places.

The present invention thus can provide a novel carbon nanotube manufacturing method that offers a user a choice of using, or not using, a metal catalyst while employing the highly productive vapor phase growth process. For a carbon nanotube application where a metal catalyst in a carbon nanotube acts as an impurity, the manufacturing method of the present invention is capable of manufacturing a carbon nanotube that does not contain a metal catalyst and readily collecting the manufactured carbon nanotube in the synthesizing portion. Since there is no metal catalyst to be removed from the carbon nanotube manufactured while the operation is run in succession, the manufacturing method of the present invention has very high productivity. On the other hand, when the presence of a metal catalyst is advantageous, the carbon nanotube manufacturing method of the present invention can enjoy the merits of the use of a metal catalyst by using the metal catalyst in the synthesizing portion.

The gas decomposer and the synthesizing portion are the same as described in the section of this specification that deals with the carbon nanotube manufacturing apparatus of the present invention.

More specifically, the carbon nanotube manufacturing method of the present invention can take the following Modes <1> through <3>, for example. Modes <1> through <3> correspond to Modes (1) through (3), respectively, which are more specific modes of the carbon nanotube manufacturing apparatus of the present invention, and are carried out by the apparatus.

In Mode <1>, the gas decomposer is placed on a surface of a substrate that serves as the synthesizing portion to bring the gas flow into contact with the gas decomposer.

In Mode <2>, the gas decomposer is placed in a gas supplying pipe, the gas flow is introduced from an inlet of the gas supplying pipe, the synthesizing portion is placed along the gas flow path that has passed through the gas decomposer, and carbon nanotubes are collected from the synthesizing portion.

The gas decomposer in Mode<2>can be an aggregation of a granular porous material, preferably, an aggregation of a granular porous material formed from a metal oxide material and from a carbon material.

In an example of more specific structure of Mode <2>, the synthesizing portion is placed in the vicinity of a port for releasing the gas flow of the gas supplying pipe. In this case, the synthesizing portion is preferably a substrate or two or more substrates, and it is preferable to set at least one of the substrates serving as the synthesizing portion perpendicular to or at an angle to the direction of the flow of the gas released from the releasing port in the gas supplying pipe.

In Mode <3>, the gas decomposer is placed approximately parallel to the direction of the flow of the gas so as to surround the entirety of or a part of the circumference of the flowing gas while the synthesizing portion is placed on a surface of the gas decomposer.

According to the carbon nanotube manufacturing method of the present invention, the gas flow is heated by a heating furnace, and decomposition of the carbon-containing raw material and synthesis of carbon nanotubes take place in a reaction tube placed in the heating furnace.

A gas decomposer of the present invention is used in carbon nanotube manufacture in which a carbon-containing raw material carried on a gas flow is decomposed to synthesize carbon nanotubes from the decomposed carbon-containing raw material, and is characterized by being composed of a porous material. The gas decomposer is preferably a porous material formed from a metal oxide material and a carbon material. Although it is possible to employ the gas decomposer of the present invention in manufacture of carbon nanotubes by various vapor phase reaction methods that use a decomposed carbon-containing raw material, the gas decomposer of the present invention is at its best when employed in the carbon nanotube manufacturing method of the present invention.

The present invention can provide novel carbon nanotube manufacturing apparatus and method, as well as a gas decomposer suitable for use in the manufacturing apparatus and method, which offer a user a choice of using, or not using, a metal catalyst according to the user's need while employing the vapor phase growth process, which is suitable for successive production of carbon nanotubes, unlike conventional vapor phase growth methods where the use of a metal catalyst is indispensable.

The present invention can provide carbon nanotube manufacturing apparatus and method which have very high manufacturing efficiency, as well as a gas decomposer suitable for use in the manufacturing apparatus and method, since the apparatus and method can provide carbon nanotubes that does not contain metal catalyst and there is no metal catalyst to be removed from the carbon nanotube manufactured.

It is also possible for the present invention to use a metal catalyst. Then a carbon nanotube growth position can be specified and, if the metal catalyst used has an action of decomposing a carbon raw material employed, carbon nanotubes grow from the raw material decomposed by the gas decomposer and from the raw material decomposed by the action of the metal catalyst both, thus improving the production efficiency even more.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

A specific description is given below on the present invention.

Embodiment 1

Figure 1:
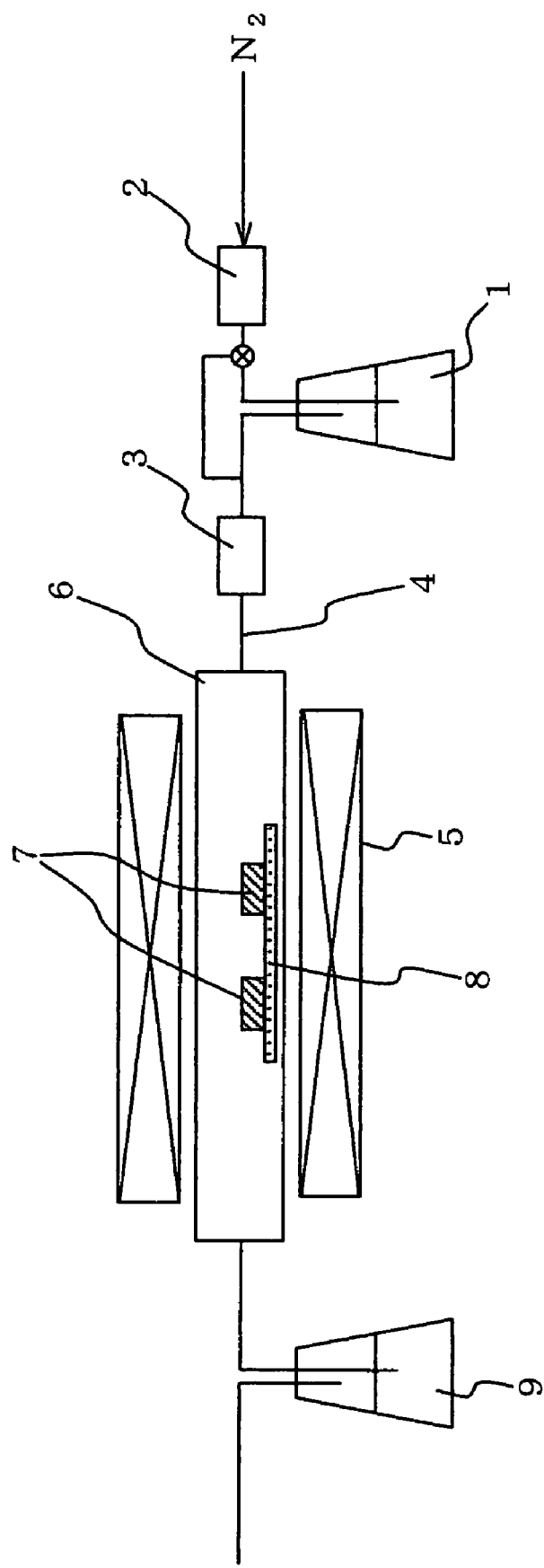
FIG. 1 is a schematic sectional view showing a manufacturing apparatus of Embodiment 1, which is an example of a carbon nanotube manufacturing apparatus of the present invention.

FIG. 1 is a schematic sectional view showing a manufacturing apparatus of Embodiment 1, which is an example of a carbon nanotube manufacturing apparatus of the present invention. Hereinafter, a carbon nanotube manufacturing apparatus may also be referred to as manufacturing apparatus. The manufacturing apparatus of this embodiment has the structure of Mode (1) and is used in the carbon nanotube manufacturing method (hereinafter may also be referred to as manufacturing method) of Mode <1>.

The manufacturing apparatus shown in FIG. 1 is equipped with a raw material tank 1, a carrier gas flow rate adjuster 2, a raw material gas flow rate adjuster 3, a gas supplying pipe 4, a heating furnace (heating unit) 5, a reaction tube 6, a gas decomposer 7, a substrate (fixed portion) 8, and an exhaust trap 9.

The raw material tank 1 stores a carbon source for forming carbon nanotubes. The carbon source is mixed with a carrier to obtain a feeding gas that contains a raw material. In mixing the carbon source, which is the raw material, and the carrier, the flow rate of the carrier gas is adjusted by the carrier gas flow rate adjuster 2 whereas the flow rate of the carbon source is adjusted by the raw material gas flow rate adjuster 3. Then the mixture is injected into the reaction tube 6 through the gas supplying pipe 4. It is also possible in the present invention to choose a carrier gas that serves as a carbon source. In this case, the process of mixing the carrier gas with other gas may be omitted and the carrier gas alone can constitute the feeding gas, which is sent into the reaction tube 6 by the gas supplying pipe 4 preferably with the help of a vacuum device set downstream of the reaction tube 6.

In the present invention, the raw material, namely the carbon source, can be any organic compound as long as it can be decomposed in the reaction tube 6 to provide carbon for producing carbon nanotubes. Examples of preferred organic compounds include alcohols such as methanol, ethanol, and propanol; ketones such as acetone; aromatic hydrocarbon compounds such as benzene, toluene, and styrene; sulfur heterocyclic compounds such as benzothiophene and thiophene. Alcohol-based organic compounds are particularly desirable. Ethanol is employed in this embodiment.

The present invention can employ as the carrier gas any gas that is inactive in the reaction tube 6 for producing carbon nanotubes. Specific examples of the carrier gas include argon, neon, hydrogen, nitrogen, and helium. Nitrogen gas ($N_2$) is particularly suitable as the carrier gas and is employed in this embodiment.

The gas supplying pipe 4 in this embodiment is structured to send the raw material gas into the reaction tube 6, which is placed inside the heating furnace 5. This embodiment employs as the gas supplying pipe 4 a stainless steel pipe having a diameter of 6 mm. However, no particular limitations are put on the material of the gas supplying pipe 4 if the required performances such as heat resistance and pressure resistance are met. The gas supplying pipe 4 in this embodiment is fitted to a not-shown opening placed at an end of the reaction tube 6 to introduce gas. Alternatively, the gas supplying pipe 4 may be inserted in the reaction tube 6 to reach the middle section of the reaction tube 6 and introduce the gas in this section (see Embodiment 2).

This embodiment employs a horizontal furnace as the heating furnace 5. In the present invention, the heating furnace is not particularly limited in structure, size, material, and shape and can be horizontal or vertical as long as it is capable of heating the interior of the reaction tube to a given temperature. When a vertical furnace is employed, the raw material flow can either be a downward flow or an upward flow.

The reaction tube in the present invention is not particularly limited in structure, size, material, and shape as long as its interior is kept at a given temperature by the thermal energy provided from the heating furnace and it is capable of housing the gas decomposer as well as a substrate or the like that serves as the synthesizing portion. This embodiment employs as the reaction tube 6 a silica glass tube that has a cylindrical shape with an inner diameter of 30 mm and a length of 50 cm.

The reaction tube 6 may also house, for example, a heater or like other unit capable of controlling the temperature of the gas decomposer and of the substrate separately.

The gas decomposer in the present invention has no particular limitations if its heat resistance is high enough and if it has a function of decomposing a raw material carried on a gas flow upon contact with the gas flow to present the decomposed raw material for reaction. Desirably, the gas decomposer is formed from a porous material and, more desirably, a porous material having fine pores each of which is 0.3 to 100 nm in diameter.

Highly heat-resistant materials suitable for the gas decomposer of the present invention (specifically, a material that is stable at 600° C.) are ceramic materials and carbon materials. Examples of ceramic materials include metal oxides, metal carbides, and metal nitrides. A preferred metal oxide is aluminosilicate containing an Al oxide and a Si oxide as its major ingredients.

As has been described, the fine pores of the porous material suitable for the gas decomposer of the present invention are 0.3 to 100 nm in diameter. Desirably, the diameter is 0.3 to 10 nm and, more desirably, 0.3 to 2 nm.

One of the most suitable porous materials having fine pores in the above diameter range is a zeolite-based material, specifically, a molecular sieve. Aside from zeolite, a porous carbon material is preferred, specifically, activated charcoal (pore diameter: 2 to 80 nm), binchotan charcoal (pore diameter: 2 nm to 100 µm), or the like.

When a molecular sieve is used as the gas decomposer for manufacture of carbon nanotubes in accordance with the present invention, reuse of the molecular sieve could lower the yield of carbon nanotubes. If this is the case, the molecular sieve has experienced volume shrinkage. Supposedly, the volume shrinkage has taken place because the crystal structure of zeolite has been changed by high temperature and the fine pores have been flattened as a result. It is therefore desirable to replace the used molecular sieve with a new one at a certain frequency and, more desirably, a new molecular sieve is used each time the manufacture operation is newly started.

Degradation from use is not a problem limited to a molecular sieve. Whatever material is used, the gas decomposer could be degraded from use since the gas decomposer is subjected to high temperature and is brought into contact with raw material gas, and while most of carbon nanotubes manufactured are collected from the synthesizing portion, which will be described later, a small portion of the carbon nanotubes could be left in the gas decomposer. Accordingly, it is desirable in the present invention to replace the gas decomposer with a new one at a certain frequency and, more desirably, a new gas decomposer is used each time the manufacture operation is newly started. Preferably, a cartridge type gas decomposer is employed to facilitate gas decomposer replacement.

The gas decomposer in the present invention can take any configuration as long as the feeding gas containing a raw material can be brought into contact with and pass through the gas decomposer. For instance, the material of the gas decomposer may be in a granular state (powdery state) and the grains or powder may be applied to form the gas decomposer. The gas decomposer material may also be processed to have a filter shape or a pellet shape, which is shaped into a concave shape or a convex shape in order to increase the area of contact with the raw material gas.

The gas decomposer can be set in any place inside the reaction tube, which is kept at a temperature suitable to decompose the raw material in the feeding gas, as long as the raw material can be brought into contact with the gas decomposer. Preferably, the gas decomposer is placed directly on an inner wall of the reaction tube, or is applied to an inner wall of the reaction tube, or is positioned to block the entire gas flow path in the reaction tube while ensuring a passage for gas (for instance, the flow path is filled with a granular gas decomposer, or a filter-like gas decomposer is put in the flow path).

The gas decomposer 7 in this embodiment is a molecular sieve in the form of pellets (Molecular Sieve Type 3A, 1/16, a product of Nacalai Tesque Inc.), and is placed on the substrate (fixed portion) 8, which is set in the reaction tube 6.

In the present invention, the synthesizing portion where a carbon structure is generated and deposited has no particular limitations and can take various shapes. Desirably, a substrate is used as the synthesizing portion. The substrate here only has to include a planar portion suitable to collect carbon nanotubes generated, and has no need to be flat throughout.

Ceramic-based materials are most suitable for a substrate that serves as the synthesizing portion. Specific examples of ceramic-based materials include alumina, titanium oxide, tungsten carbide, barium carbide, silicon oxide, silicon carbide, silicon nitride, and zirconium oxide. Silica gel, silica glass, and metal may also be employed. When a metal substrate is used, it is particularly desirable to choose one that contains metal used as a metal catalyst in conventional vapor phase growth methods, such as Fe, Ni, or Y. A similar effect is obtained if such material is formed into a thin film by evaporation or the like on an appropriate substrate.

A substrate formed from one of the materials listed in the above does not leave metal catalyst in obtained carbon nanotubes. The deposited carbon nanotubes are scraped off of a flat and smooth surface of the substrate and thus collected easily.

A metal catalyst as the ones given in the above may be put into a powdery state, a granular state, or a pellet state and placed on a substrate or the like that serves as the synthesizing portion. By placing a metal catalyst on a substrate (including forming a thin film of a metal catalyst on a substrate), a carbon nanotube growth point can be specified in the synthesizing portion and thus carbon nanotubes can be collected at an improved efficiency. However, when a powdery, or granular, or pellet-like metal catalyst is simply put on a substrate or the like that serves as the synthesizing portion, the metal catalyst is contained in carbon nanotubes manufactured. In this case, an operation of separating the metal catalyst from the obtained carbon nanotubes may become necessary depending on the use of the carbon nanotubes.

This embodiment employs a plate-like alumina substrate (2 cm×2 cm) for the synthesizing portion and does not use a metal catalyst.

The substrate 8 in this embodiment is placed on the inner circumferential surface of the reaction tube 6 approximately in parallel to the flow of supplied gas (the gas decomposer 7 is placed on the substrate 8). In the present invention, a substrate or the like that serves as the synthesizing portion can be set in any place near or downstream of a point where feeding gas comes into contact with the gas decomposer. Preferably, the synthesizing portion is positioned to have a direct contact with the raw material decomposed by the gas decomposer. To give a preferred example, the gas decomposer 7 is directly put on the substrate 8 as in this embodiment, or the synthesizing portion is arranged as in Embodiment 2, which will be described later.

The exhaust trap 9 in this embodiment is structured to make the gas that has been let out of the reaction tube 6 pass through an appropriate liquid as bubbles. The liquid through which the gas passes has to be capable of dissolving the raw material gas and the decomposed raw material gas. For instance, when one of alcohols such as ethanol is employed as the raw material gas, water can serve as this liquid. The liquid in this embodiment is water. With the exhaust trap 9, air contamination can be prevented in the site of carbon nanotube manufacture.

The interior of the reaction tube 6 is heated to a set temperature, 800° C., by running the heating furnace 5. In the present invention, the reaction temperature in the reaction tube is usually set to 400 to 1300° C., desirably 600 to 1000° C., more desirably 750 to 900° C.

The carrier gas flow rate adjuster 2 adjusts the flow rate of nitrogen gas to 50 ml/min. before the nitrogen gas is sent to the raw material tank 1 to be mixed with the raw material, ethanol. After the total flow rate is adjusted by the raw material gas flow rate adjuster 3 to 50 ml/min., the mixture gas is supplied to a reaction region in the reaction tube 6 through the gas supplying pipe 4. The raw material is brought into contact with the gas decomposer 7 set in the reaction tube 6 to be decomposed acceleratedly and, as a result, carbon nanotube growth takes place on the substrate 8, which is set in the vicinity of the gas decomposer 7 in the reaction tube 6. The temperature of the heating furnace 5 and the raw material gas flow condition are maintained for an hour. The exhaust gas resulted from the manufacture of carbon nanotubes is put through the exhaust trap 9, where the raw material, the decomposed raw material, and the like in the exhaust gas are captured to discharge nitrogen alone.

Figure 2:
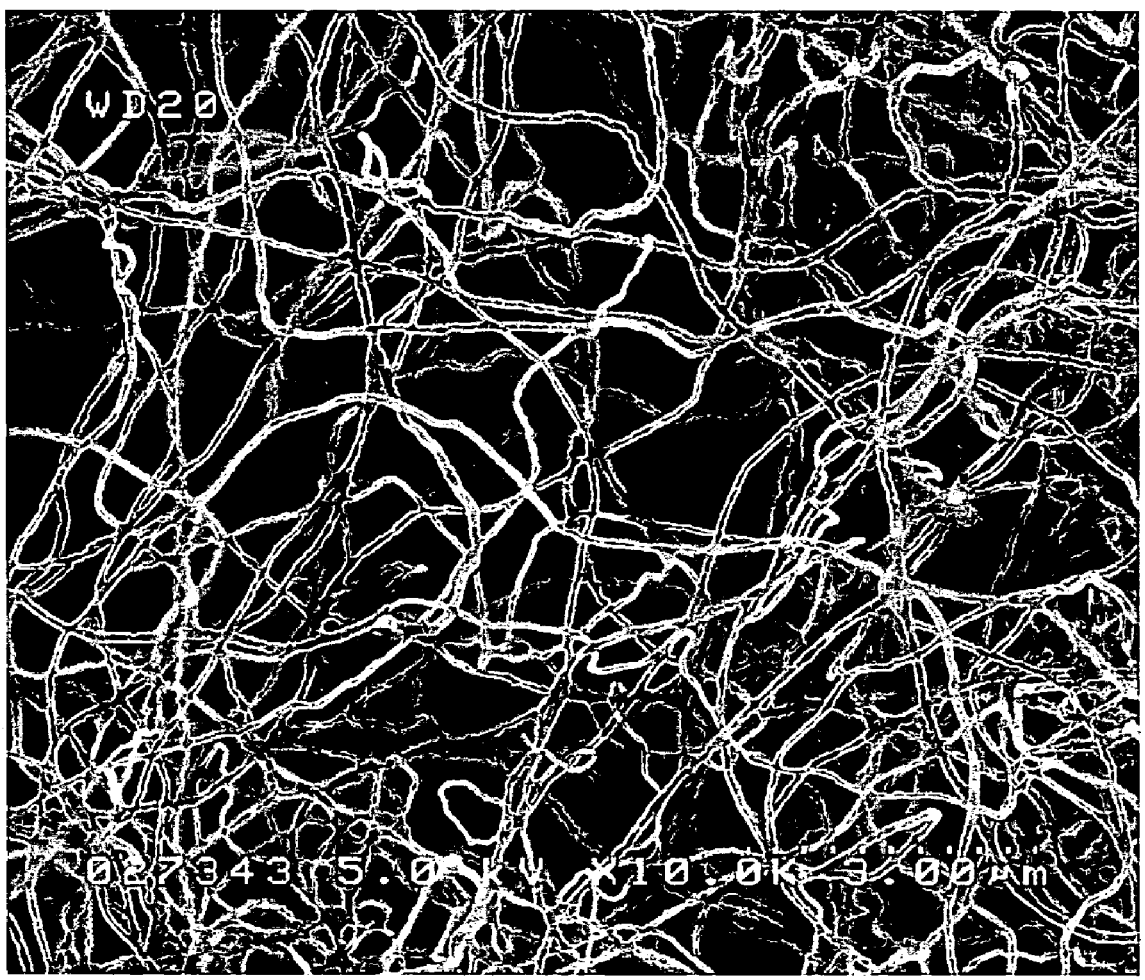
FIG. 2 is an SEM observation picture (magnification: ×10000) of carbon nanotubes obtained in Embodiment 1.

After an hour-long manufacture operation, supply of the raw material is stopped and only nitrogen gas is supplied from the gas supplying pipe 4 to cool the manufacturing apparatus down to room temperature. Carbon nanotubes created by vapor phase growth in the manner described above are deposited like grime on the substrate 8 made of alumina. The carbon nanotube deposit can readily be collected by scraping it off the surface of the substrate 8. The grime-like deposit is observed by SEM and TEM to reveal that the deposit is a fibrous substance which does not contain a metal catalyst and which is 50 to 200 nm in diameter and 10 to 200 μm in length, namely, carbon nanotubes. An SEM observation picture (magnification: ×10000) of the carbon nanotube is shown in FIG. 2. Note that there is a slight error in magnification in the blown-up picture (the same applies to any SEM observation picture below). The SEM picture shows that carbon nanotubes of high purity are generated without forming amorphous carbon or any other carbon lumps. The mass of the carbon nanotube obtained in this embodiment is calculated from a change in mass of a 20-mm square of the substrate, namely, the difference in substrate mass between before and after the carbon nanotube is deposited. The result of the calculation shows that the carbon nanotube synthesized is about 8 mg in mass.

Figure 3:
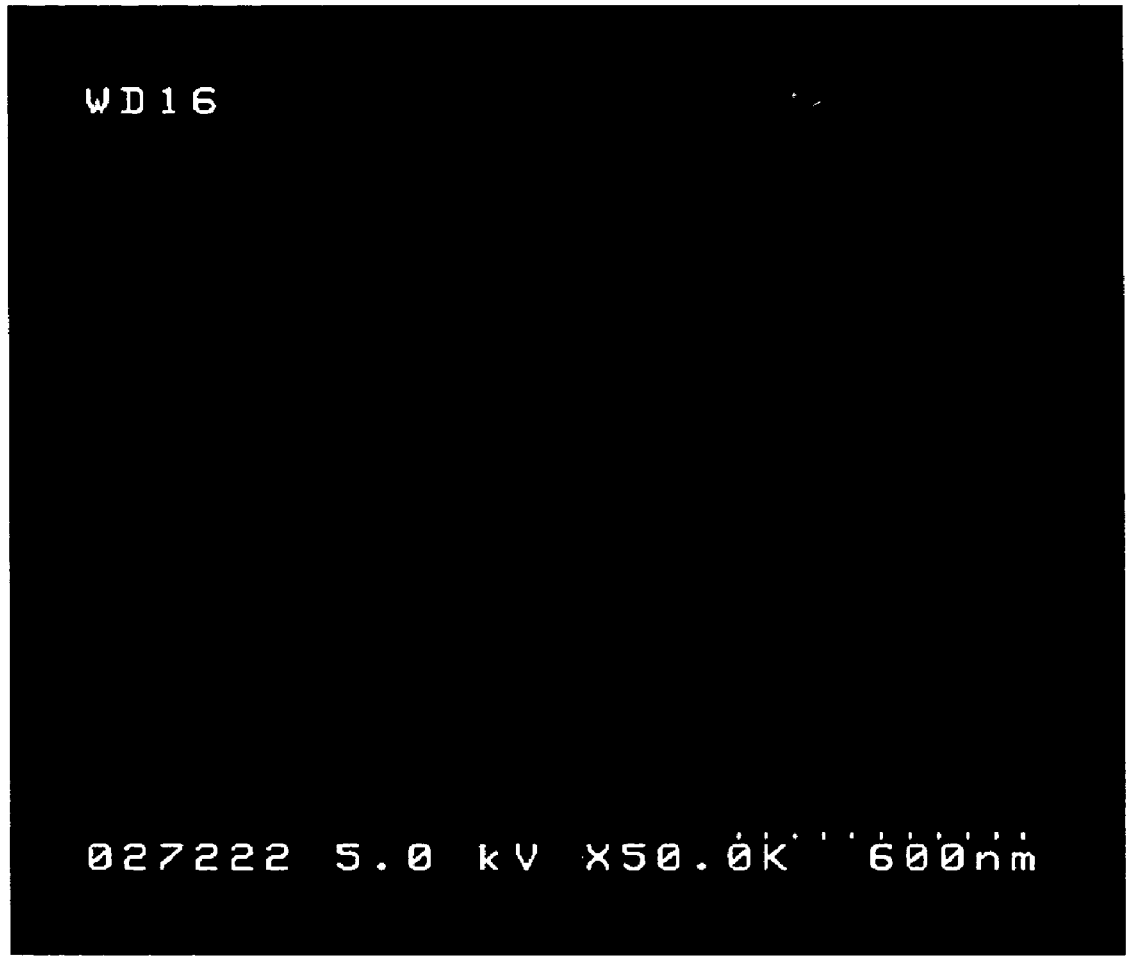
FIG. 3 is an SEM observation picture (magnification: ×50000) of carbon nanotubes of a gray substance obtained in a comparative test in Embodiment 1.

For comparison, a carbon nanotube manufacturing apparatus similar to the manufacturing apparatus of this embodiment has been prepared. In this apparatus, the gas decomposer 7 is not set in the reaction tube 6 and the substrate 8 made of alumina alone is placed in the middle section of the interior of the reaction tube 6. The apparatus has been run for an hour under the same carbon nanotube creating conditions, obtaining no grime-like deposit although the entire substrate 8 has been turned pale gray. An analysis through an SEM observation has confirmed that the pale gray substance on the surface of the substrate 8 is a thin layer of amorphous carbon deposit. An SEM observation picture (magnification: ×50000) of the deposit is shown in FIG. 3.

From the above results, it is clear that the gas decomposer in this embodiment has an effect of manufacturing carbon nanotubes efficiently.

Embodiment 2

Figure 4:
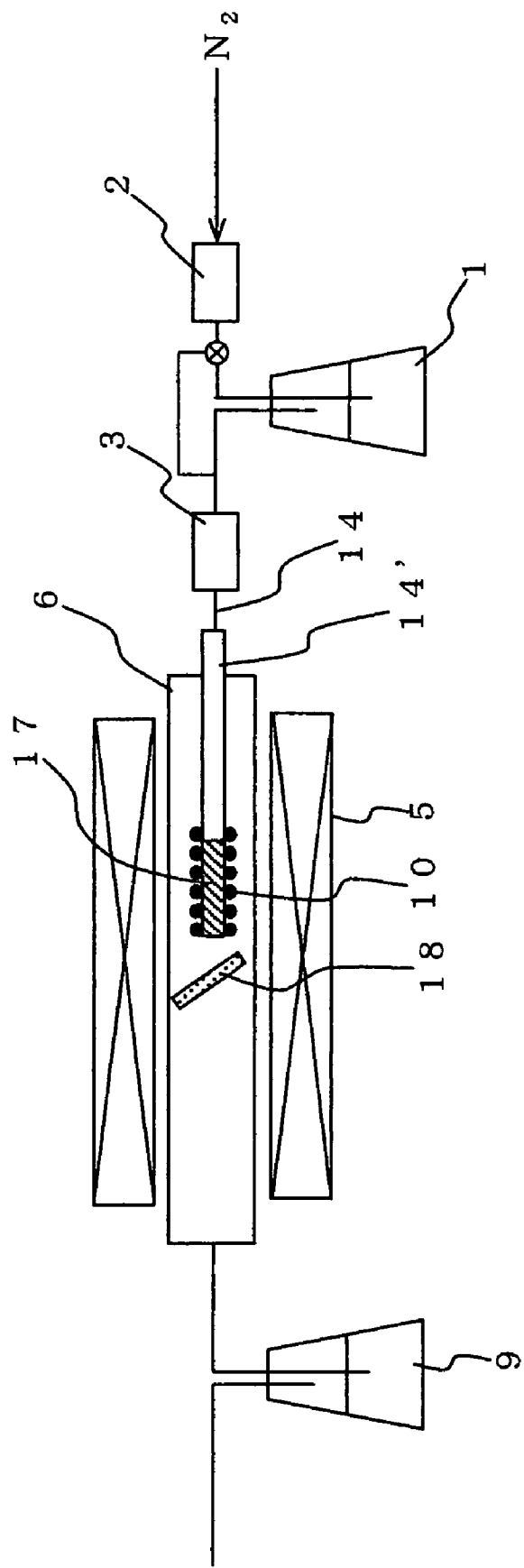
FIG. 4 is a schematic sectional view showing a manufacturing apparatus of Embodiment 2, which is an example of a carbon nanotube manufacturing apparatus of the present invention.

FIG. 4 is a schematic sectional view showing a manufacturing apparatus of Embodiment 2, which is an example of a manufacturing apparatus of the present invention. The manufacturing apparatus of this embodiment has the structure of Mode (2) and is used in the manufacturing method of Mode <2>.

The manufacturing apparatus of this embodiment is identical with that of Embodiment 1 except that this embodiment employs gas supplying pipes 14 and 14' which are different in structure from the gas supplying pipe 4 and that the items placed in the reaction tube 6 are different in detail. Therefore, members of this embodiment and of Embodiment 1 that have identical functions are denoted by the same symbols as shown in FIGS. 1 and 4, and detailed descriptions on such members are omitted here.

As shown in FIG. 4, the manufacturing apparatus of this embodiment has the gas supplying pipe 14 communicated with the gas supplying pipe 14', which has an inner diameter (15 mm) slightly larger than that of the gas supplying pipe 14 and is extended to the interior of the reaction tube 6. A gas decomposer 17 is placed in an opening of the gas supplying pipe 14' that is in the reaction tube 6. As the gas decomposer 17, a pellet-like molecular sieve (Molecular Sieve Type 3A, 1/16, about 7 g, a product of Nacalai Tesque Inc.) fills the space for a length of 5 cm.

The gas supplying pipe 14' has a heater 10 built in to heat the gas decomposer 17. When heat from the heating furnace 5 has difficulties in reaching the gas decomposer as in this embodiment where the gas decomposer 17 is stuffed in the opening of the gas supplying pipe 14', it is preferable to provide an auxiliary heating unit that serves to heat the gas decomposer. With an auxiliary heating unit (heater 10 in this embodiment) built in, the temperature in the area where the gas decomposer 17 is placed is usually set to 500 to 1300° C., preferably 600 to 900° C. The temperature is set to 850° C. in this embodiment.

A substrate 18 serving as the synthesizing portion is an alumina substrate similar to Embodiment 1. The substrate 18 is placed to face the opening (releasing port) of the gas supplying pipe 14' in the reaction tube 6 across a 2 mm distance and tilted at an angle (20° with respect to the perpendicular to the pipe 14').

Figure 5:
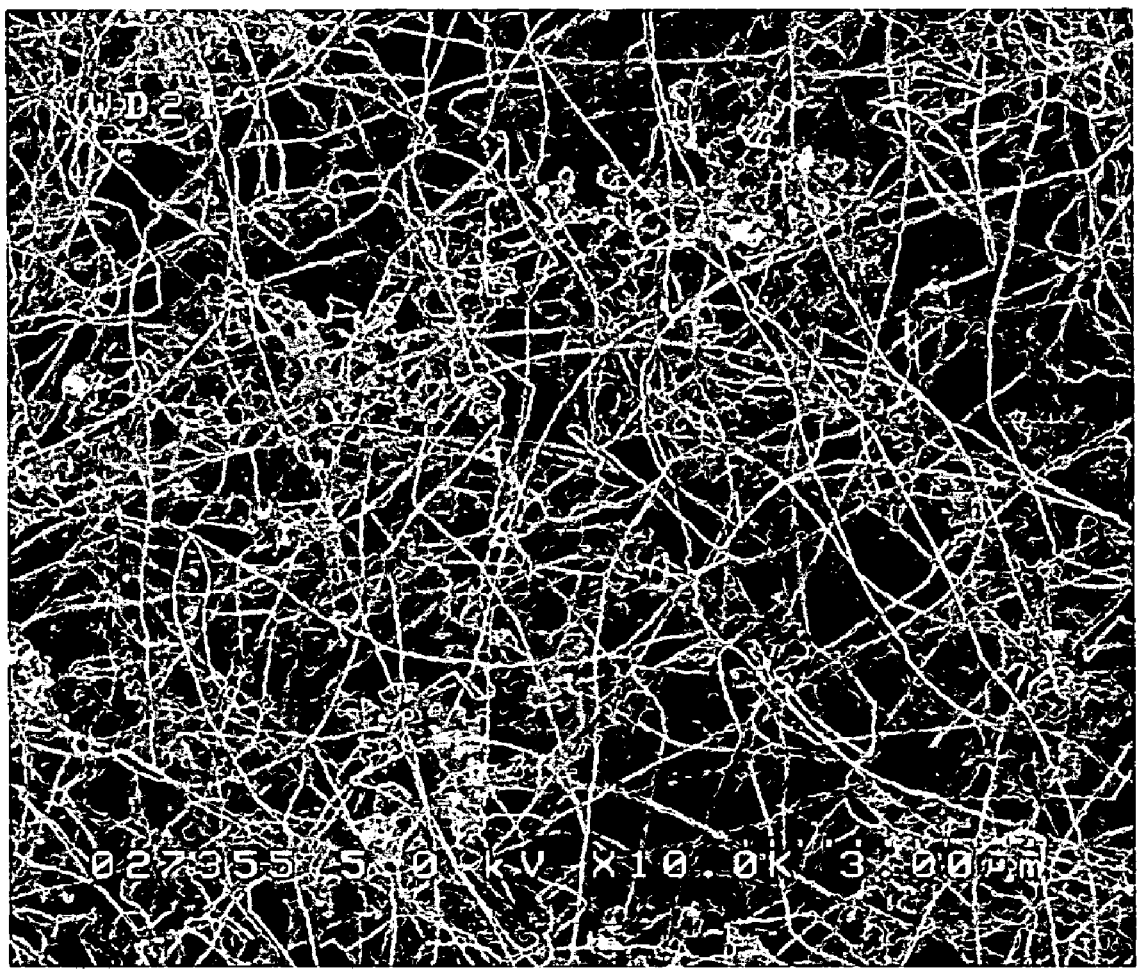
FIG. 5 is an SEM observation picture (magnification: ×10000) of carbon nanotubes obtained in Embodiment 2.

While heating the gas decomposer 17 to 850° C. with the heater 10, an hour-long carbon nanotube manufacture operation has been carried out employing the same heating condition for the heating furnace 5 (the set temperature for the reaction tube 6) and the same gas flow condition as in Embodiment 1. As a result, grime-like carbon nanotubes have deposited on the surfaces of the substrate 18 made of alumina. The deposit has readily been collected by scraping the surface of the substrate 18. The grime-like deposit has been observed by SEM and TEM to reveal that the deposit is a fibrous substance which does not contain a metal catalyst and which is 20 to 50 nm in diameter and 1 to 20 μm in length, namely, carbon nanotubes. An SEM observation picture (magnification: ×10000) of the carbon nanotube is shown in FIG. 5. The SEM picture shows that the carbon nanotube generated is of high purity and includes no amorphous carbon similar to the carbon nanotube obtained in Embodiment 1.

Embodiment 3

Figure 6:
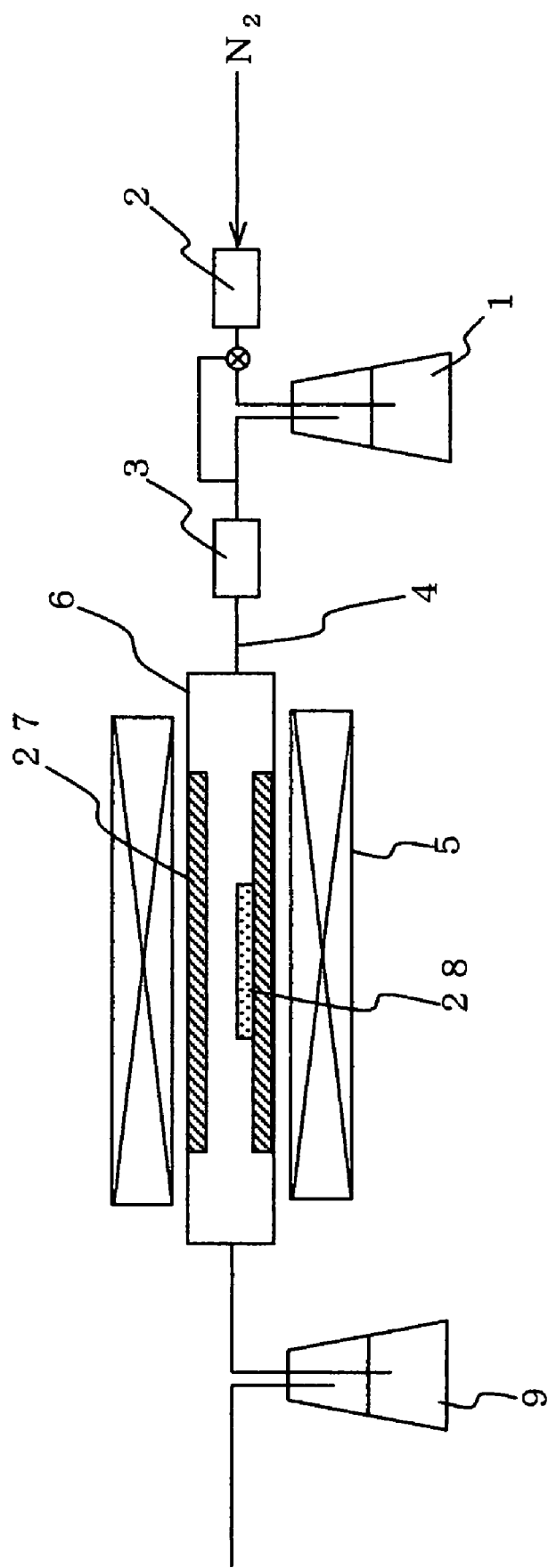
FIG. 6 is a schematic sectional view showing a manufacturing apparatus of Embodiment 3, which is an example of a carbon nanotube manufacturing apparatus of the present invention.

FIG. 6 is a schematic sectional view showing a manufacturing apparatus of Embodiment 3, which is an example of a manufacturing apparatus of the present invention. The manufacturing apparatus of this embodiment has the structure of Mode (3) and is used in the manufacturing method of Mode <3>.

The manufacturing apparatus of this embodiment is identical with that of Embodiment 1 except that the items placed in the reaction tube 6 are different in detail. Therefore, members of this embodiment and of Embodiment 1 that have identical functions are denoted by the same symbols as shown in FIGS. 1 and 6, and detailed descriptions on such members are omitted here.

As shown in FIG. 6, the manufacturing apparatus of this embodiment employs a gas decomposer 27, which is obtained by applying a gas decomposer material to an inner wall of the reaction tube 6. A substrate 28 made of alumina, similar to the substrate 8 of Embodiment 1, is placed on the inside of the gas decomposer 27. This embodiment employs the gas decomposer material used in Embodiment 1 (Molecular Sieve Type 3A, 1/16, a product of Nacalai Tesque Inc.), but the molecular sieve is crushed in a mortar to be dispersed in water. The thus prepared application liquid (mixture ratio (mass ratio) of the gas decomposer material to water is 2:1) is applied to the inner wall of the reaction tube 6 to a thickness of 1 mm to obtain the gas decomposer 27. The gas decomposer 27 of this structure can also be obtained by shaping a gas decomposer material into a pipe that can be inserted and fitted in the reaction tube 6 without clearance and by inserting the molded pipe in the reaction tube 6. In this alternative method, the pipe-shaped gas decomposer can act as a cartridge and facilitates the replacement. The alternative method is superior in that regard to the former method in which an old gas decomposer has to be removed by shaving it off and put a new gas decomposer by preparing the application liquid and applying the liquid.

Figure 7:
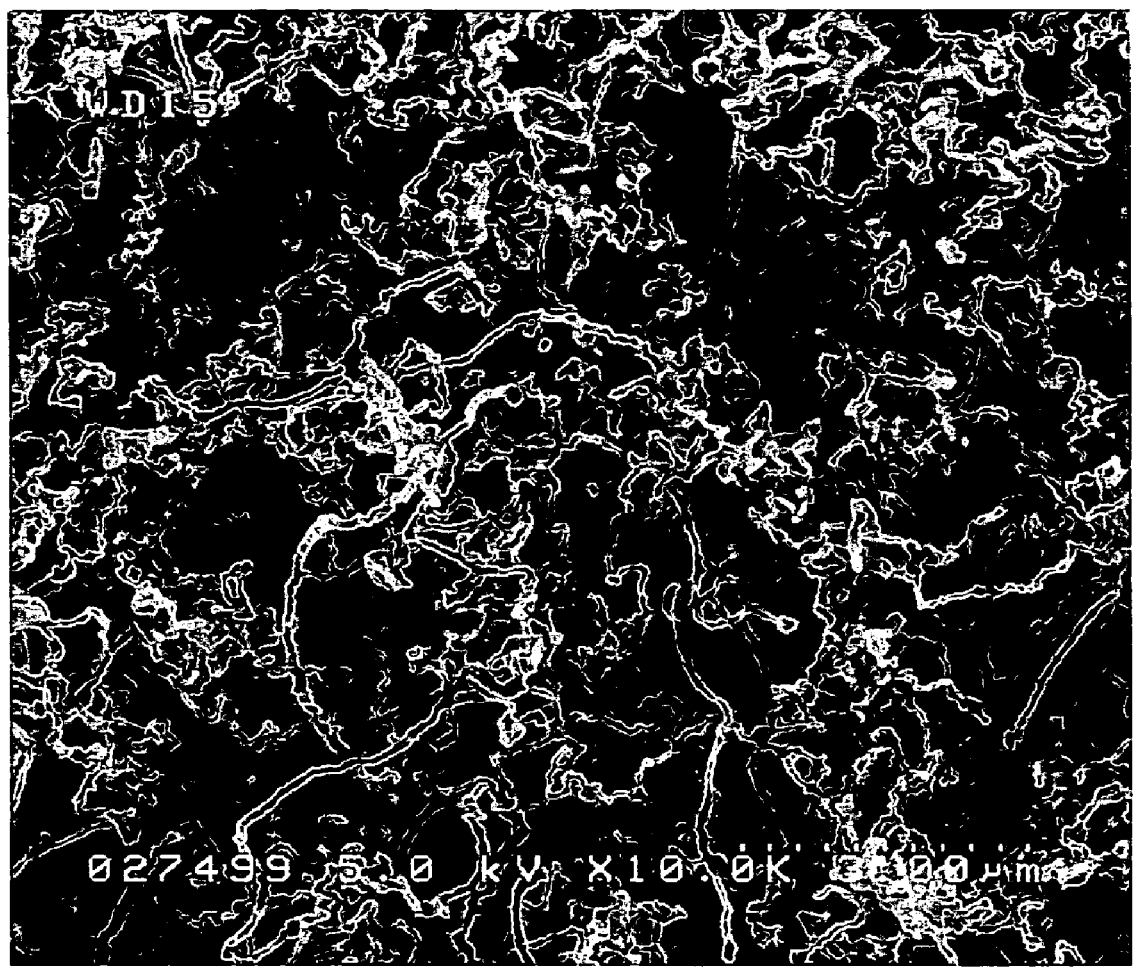
FIG. 7 is an SEM observation picture (magnification: ×10000) of carbon nanotubes obtained in Embodiment 3.

An hour-long carbon nanotube manufacture operation has been carried out employing the same heating condition for the heating furnace 5 (the set temperature for the reaction tube 6) and the same gas flow condition as in Embodiment 1. As a result, grime-like carbon nanotubes have deposited on the surfaces of the substrate 28 made of alumina. The deposit has readily been collected by scraping the surface of the substrate 28. The grime-like deposit has been observed by SEM and TEM to reveal that the deposit is a fibrous substance which does not contain a metal catalyst and which is 40 to 80 nm in diameter and 1 to 20 μm in length, namely, carbon nanotubes. An SEM observation picture (magnification: ×10000) of the carbon nanotube is shown in FIG. 7. The SEM picture shows that the carbon nanotube generated is of high purity and includes no amorphous carbon similar to the carbon nanotube obtained in Embodiment 1.

Embodiment 4

Figure 8:
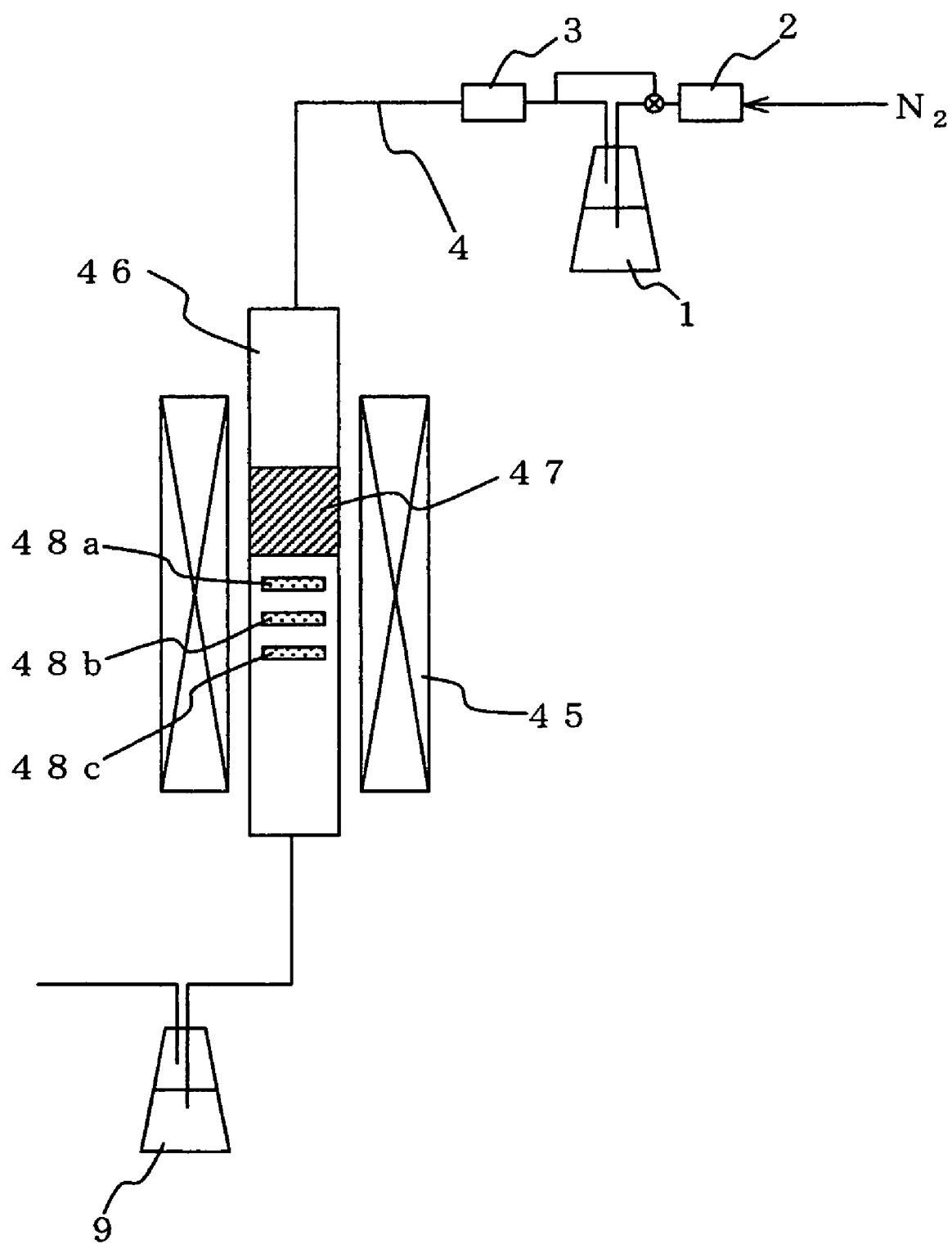
FIG. 8 is a schematic sectional view showing a manufacturing apparatus of Embodiment 4, which is an example of a carbon nanotube manufacturing apparatus of the present invention.

FIG. 8 is a schematic sectional view showing a manufacturing apparatus of Embodiment 4, which is an example of a manufacturing apparatus of the present invention. The manufacturing apparatus of this embodiment employs vertical heating furnace and reaction tube, and items in the reaction tube and pipes are arranged accordingly.

The manufacturing apparatus of this embodiment is identical to that of Embodiment 1 except that a heating furnace (heating unit) 45 and a reaction tube 46 of this embodiment are of vertical type and that the items placed in the reaction tube 46 are accordingly different in detail. Therefore, members of this embodiment and of Embodiment 1 that have identical functions are denoted by the same symbols as shown in FIGS. 1 and 8, and detailed descriptions on such members are omitted here.

The feeding gas flows downward in the reaction tube 46. An upper part of the reaction tube 46, which has an inner diameter of 30 mm, is filled with a molecular sieve (Molecular Sieve Type 3A, 1/16, about 6 g, a product of Nacalai Tesque Inc.) for a length of 1 cm in the direction of the flow of the feeding gas to obtain a gas decomposer 47. An alumina substrate is chosen as a substrate that serves as the synthesizing portion similar to Embodiment 1. However, the synthesizing portion in this embodiment is composed of three substrates, 48a, 48b, and 48c, which are set parallel to one another at 1-cm intervals approximately perpendicular to the direction of the flow of the feeding gas downstream of the gas decomposer 47 (the substrates 48 face the gas decomposer 47). When plural substrates are arranged approximately parallel to one another in this manner, carbon nanotubes which the first substrate fails to capture can be caught by the second and subsequent substrates. The carbon nanotube manufacturing efficiency is thus improved.

Figure 9:
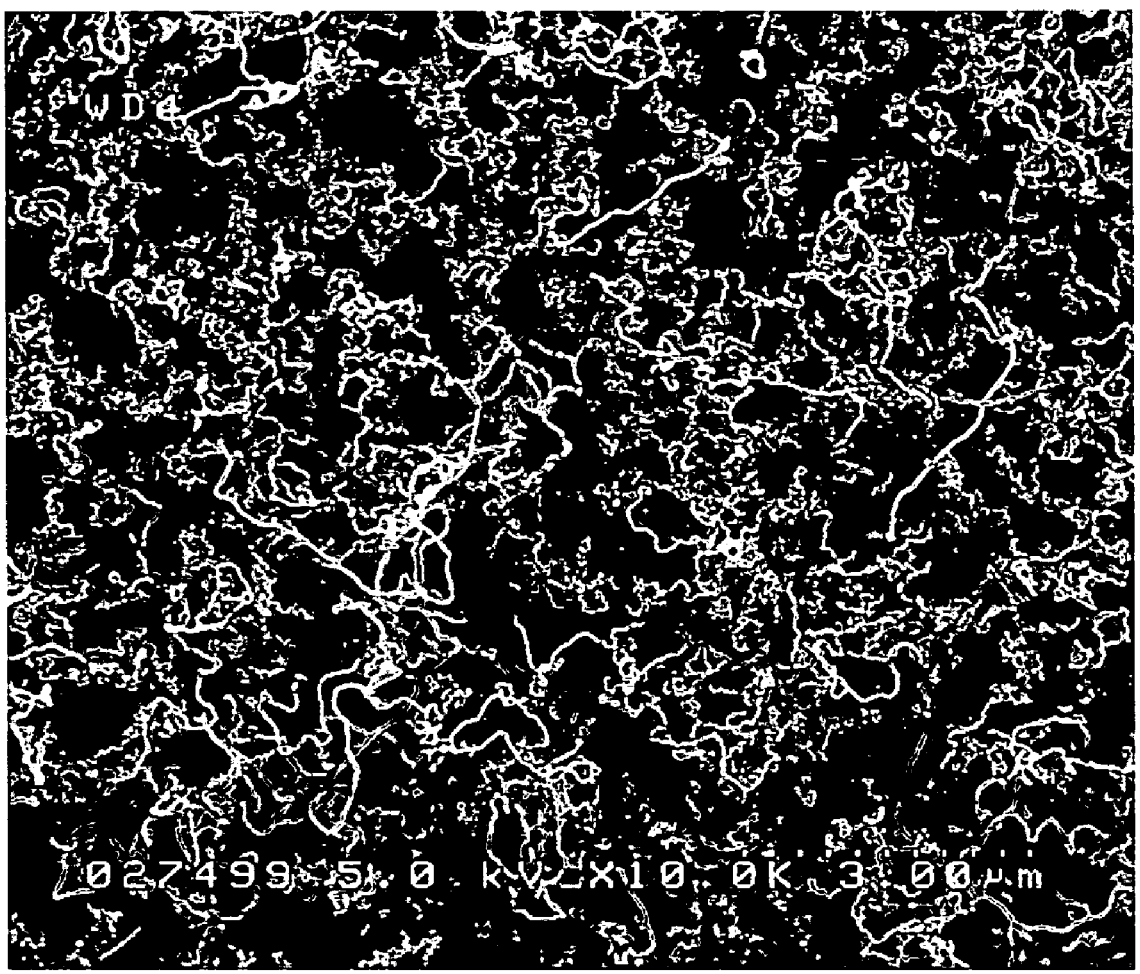
FIG. 9 is an SEM observation picture (magnification: ×10000) of carbon nanotubes obtained in Embodiment 4.

An hour-long carbon nanotube manufacture operation has been carried out employing the same heating condition for the heating furnace 45 (the set temperature for the reaction tube 46) and the same gas flow condition as in Embodiment 1. As a result, grime-like carbon nanotubes have deposited on the surfaces of the substrates 48a, 48b and 48c made of alumina. In this embodiment where three substrates are placed in parallel horizontally, the amount of deposit has been largest on the uppermost substrate and greatly decreased toward lower substrates. However, the deposit has been found even on the lowermost substrate. The deposit has readily been collected by scraping the surfaces of the substrates 48a, 48b and 48c. The grime-like deposit has been observed by SEM and TEM to reveal that the deposit is a fibrous substance which does not contain a metal catalyst and which is 40 to 80 nm in diameter and 2 to 20 μm in length, namely, carbon nanotubes. An SEM observation picture (magnification: ×10000) of the carbon nanotube is shown in FIG. 9. The SEM picture shows that the carbon nanotube generated is of high purity and includes no amorphous carbon similar to the carbon nanotube obtained in Embodiment 1.

Embodiment 5

Figure 10:
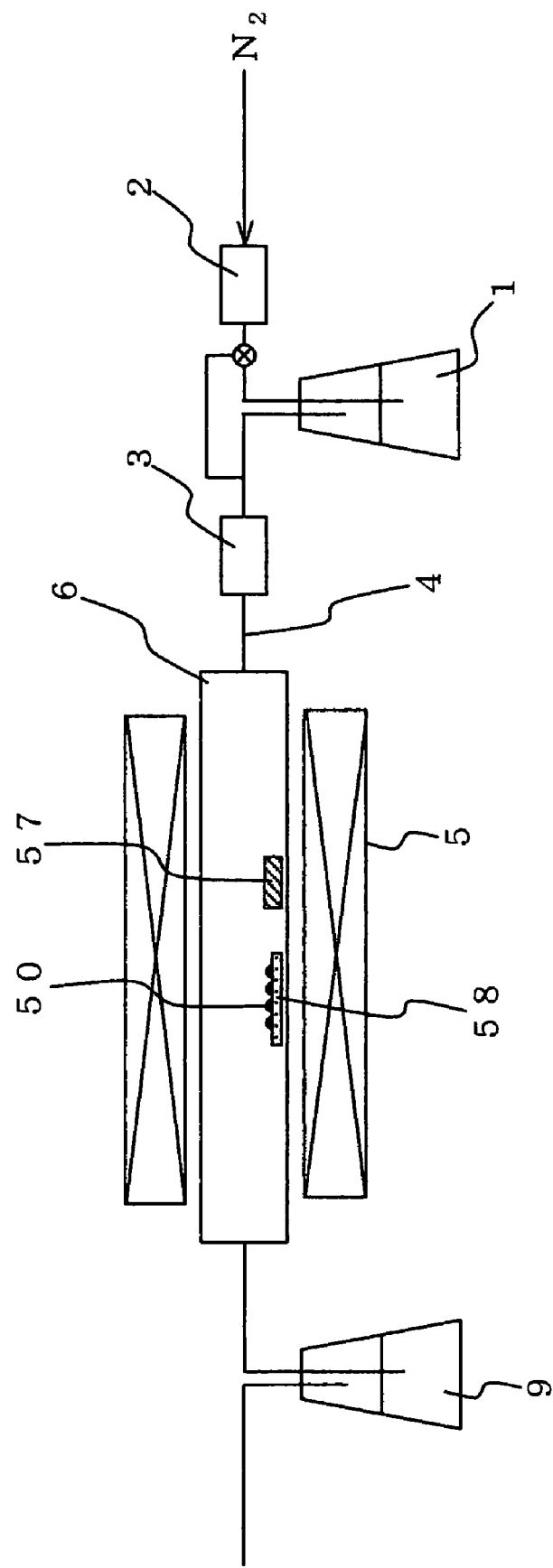
FIG. 10 is a schematic sectional view showing a manufacturing apparatus of Embodiment 5, which is an example of a carbon nanotube manufacturing apparatus of the present invention.

FIG. 10 is a schematic sectional view showing a manufacturing apparatus of Embodiment 5, which is an example of a manufacturing apparatus of the present invention. The manufacturing apparatus of this embodiment employs a metal catalyst. The manufacturing apparatus of this embodiment is identical with that of Embodiment 1 except that the items placed in the reaction tube 6 are different in detail. Therefore, members of this embodiment and of Embodiment 1 that have identical functions are denoted by the same symbols as shown in FIGS. 1 and 10, and detailed descriptions on such members are omitted here.

As shown in FIG. 10, the manufacturing apparatus of this embodiment places a gas decomposer 57 and a substrate 58, which serves as the synthesizing portion, side by side in the direction of the flow of the feeding gas.

The gas decomposer 57 is similar to the gas decomposer 7 of Embodiment 1. The difference between the two is that two pellets are used for the gas decomposer 7 of Embodiment 1 whereas one pellet is used for the gas decomposer 57 of this embodiment.

The substrate 58 is made of alumina as in embodiment 1. However, the substrate 58 and the gas decomposer 57 are arranged side by side in the direction of the flow of the feeding gas instead of placing the substrate 58 adjacent to or opposite to the gas decomposer 57. Fine particles of Ni having a diameter of 10 to 100 nm are put as a metal catalyst on a surface of the substrate 58 at a density of about 100 particles per 1-μm square.

Figure 11:
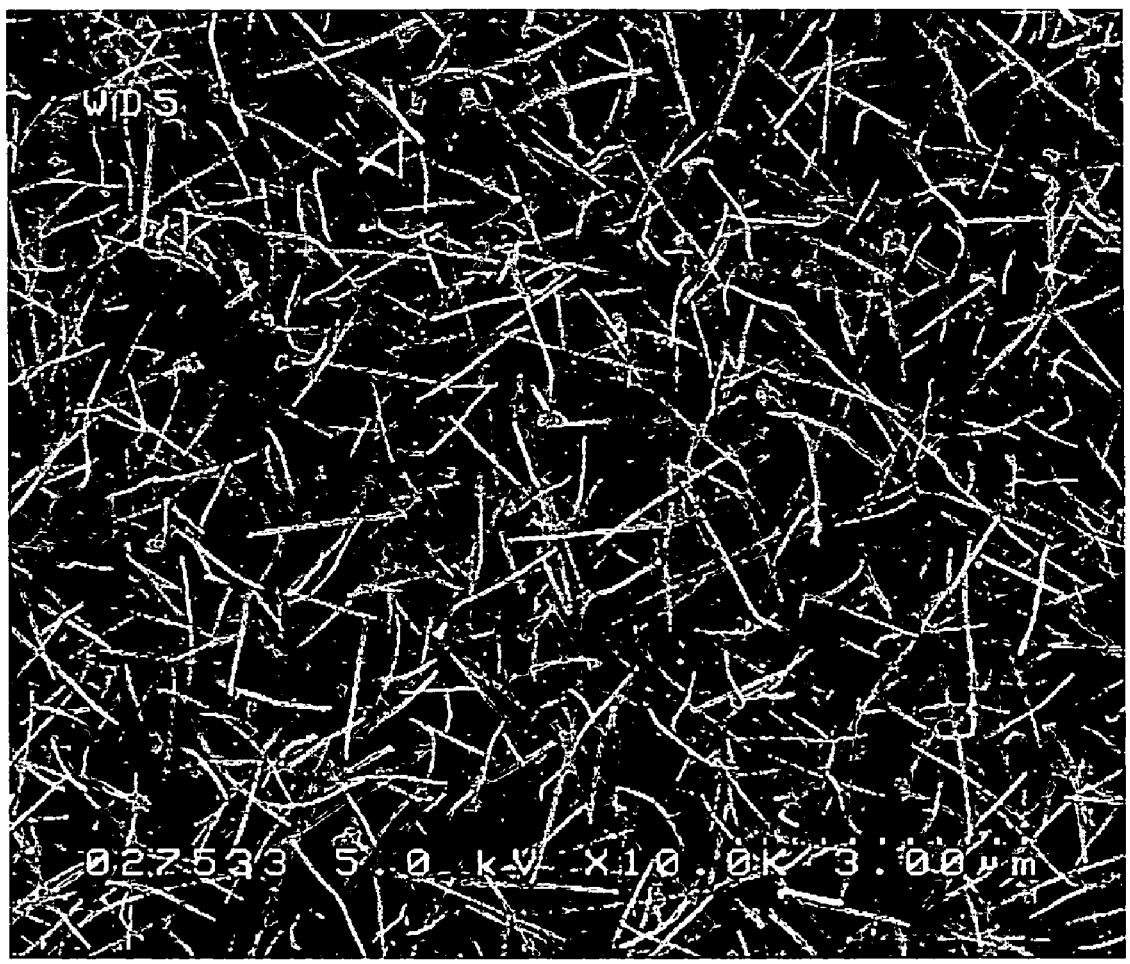
FIG. 11 is an SEM observation picture (magnification: ×10000) of carbon nanotubes obtained in Embodiment 5.

An hour-long carbon nanotube manufacture operation has been carried out employing the same heating condition for the heating furnace 5 (the set temperature for the reaction tube 6) and the same gas flow condition as in Embodiment 1. As a result, a grime-like carbon nanotube has been deposited on the surface of the substrate 28 made of alumina. The deposit has readily been collected by scraping the surface of the substrate 28. The grime-like deposit has been observed by SEM and TEM to reveal that the deposit is a fibrous substance which is 10 to 60 nm in diameter and 0.5 to 5 μm in length, namely, a carbon nanotube. The obtained carbon nanotube contains the metal catalyst at the tip and, in order to make this a pure carbon nanotube, the catalyst has to be separated from the obtained carbon nanotube. An SEM observation picture (magnification: ×10000) of the carbon nanotube is shown in FIG. 11.

Carbon nanotube manufacturing apparatus and method of the present invention, as well as a gas decomposer suitable for use in the manufacturing apparatus and method, have very high manufacturing efficiency and therefore are preferable for mass production of carbon nanotubes. In addition to be capable of producing carbon nanotubes in mass quantities, the present invention can present highly pure carbon nanotubes with no or few impurities mixed in.

Furthermore, carbon nanotube manufacturing apparatus and method of the present invention, as well as a gas decomposer suitable for use in the manufacturing apparatus and method, can be employed in conventional vapor phase growth methods that use metal catalysts. In elaborating a carbon nanotube, a raw material of vapor phase growth will be decomposed more quickly by setting a gas decomposer of the present invention in a reaction tube. It is easily deduced that this improves the efficiency of producing carbon nanotubes even while using a metal catalyst.

What is claimed is:

1. A carbon nanotube manufacturing apparatus, comprising:
   a reaction tube in which a carbon nanotube is grown by vapor phase growth;
   a gas supplying pipe that supplies a carbon-containing raw material carried on a gas flow to an interior of the reaction tube;
   a heating unit that heats the interior of the reaction tube;
   a gas decomposer that is placed in the reaction tube to decompose the carbon-containing raw material upon contact with the gas flow; and
   a synthesizing portion that is placed in the reaction tube downstream, in the direction of the gas flow, of the gas decomposer and continuously supplied with the decomposed carbon-containing raw material, which has been carried on the gas flow to an outside of the gas decomposer, to synthesize a carbon nanotube,
   wherein the gas decomposer is separate from and does not contact the synthesizing portion, and
   the gas decomposer is a molecular sieve.

2. A carbon nanotube manufacturing apparatus according to claim 1, wherein the synthesizing portion comprises one or two or more substrates.

3. A carbon nanotube manufacturing apparatus according to claim 1, wherein the synthesizing portion comprises two or more substrates arranged approximately parallel to one another.

4. A carbon nanotube manufacturing apparatus according to claim 1, wherein:
   the gas supplying pipe is extended to the interior of the reaction tube so that a releasing port of the gas flow is positioned inside the reaction tube; and
   the gas decomposer is placed in the gas supplying pipe in a manner that allows the gas decomposer to have contact with the flow of gas supplied.

5. A carbon nanotube manufacturing apparatus according to claim 4, further comprising an auxiliary heating unit that serves to heat the gas decomposer in the vicinity of the gas decomposer in the gas supplying pipe.

6. A carbon nanotube manufacturing apparatus according to claim 4, wherein the gas decomposer comprises an aggregation of a granular porous material.

7. A carbon nanotube manufacturing apparatus according to claim 4, wherein the gas decomposer comprises an aggregation of a granular porous material formed from a metal oxide material and from a carbon material.

8. A carbon nanotube manufacturing apparatus according to claim 4, wherein the synthesizing portion is placed in the vicinity of the gas flow releasing port of the gas supplying pipe.

9. A carbon nanotube manufacturing apparatus according to claim 8, wherein the synthesizing portion comprises one or two or more substrates.

10. A carbon nanotube manufacturing apparatus according to claim 8, wherein at least one of the substrates serving as the synthesizing portion is placed perpendicular to or at an angle to the direction of the flow of the gas released from the releasing port of the gas supplying pipe.

11. A carbon nanotube manufacturing apparatus according to claim 1, wherein a metal catalyst is put in the synthesizing portion.

12. A carbon nanotube manufacturing apparatus according to claim 11, wherein the metal catalyst having a thin film form is put in the synthesizing portion.

13. A carbon nanotube manufacturing apparatus according to claim 1, wherein the synthesizing portion comprises a substrate that is formed from a material containing a metal catalyst.

14. A carbon nanotube manufacturing apparatus according to claim 1, wherein:
   the heating unit comprises a heating furnace; and
   the reaction tube is placed inside the heating furnace.

15. A gas decomposer for use in carbon nanotube manufacture in which a carbon-containing raw material carried on a gas flow is decomposed to synthesize a carbon nanotube from the decomposed carbon-containing raw material, comprising a porous material that is a molecular sieve,
   wherein the gas decomposer is separate from and does not contact any synthesizing portion for synthesizing the carbon nanotube.

16. A gas decomposer according to claim 15, comprising a metal oxide material and a carbon material.

17. A carbon nanotube manufacturing apparatus, comprising:
   a reaction tube in which a carbon nanotube is grown by vapor phase growth;
   a gas supplying pipe that supplies a carbon-containing raw material carried on a gas flow to an interior of the reaction tube;
   a heating unit that heats the interior of the reaction tube;
   a gas decomposer that is placed in the reaction tube to decompose the carbon-containing raw material upon contact with the gas flow; and
   a synthesizing portion that is placed in the reaction tube and continuously supplied with the decomposed carbon-containing raw material, which has been carried on the gas flow to an outside of the gas decomposer, to synthesize a carbon nanotube,
   wherein the gas decomposer is separate from and does not contact the synthesizing portion, and
   the gas decomposer is a zeolite-based material which has a pore diameter of 0.3 to 100 nm.

18. A carbon nanotube manufacturing apparatus according to claim 17, the gas decomposer having a pore diameter of 0.3 to 10 nm.

19. A carbon nanotube manufacturing apparatus according to claim 17, the gas decomposer having a pore diameter of 0.3 to 2 nm.

20. A carbon nanotube manufacturing apparatus according to claim 17, wherein the synthesizing portion comprises one or two or more substrates.

21. A carbon nanotube manufacturing apparatus according to claim 17, wherein the synthesizing portion comprises two or more substrates arranged approximately parallel to one another.

22. A carbon nanotube manufacturing apparatus according to claim 17, wherein:

the gas supplying pipe is extended to the interior of the reaction tube so that a releasing port of the gas flow is positioned inside the reaction tube; and the gas decomposer is placed in the gas supplying pipe in a manner that allows the gas decomposer to have contact with the flow of gas supplied.

23. A carbon nanotube manufacturing apparatus according to claim 22, further comprising an auxiliary heating unit that serves to heat the gas decomposer in the vicinity of the gas decomposer in the gas supplying pipe.

24. A carbon nanotube manufacturing apparatus according to claim 22, wherein the gas decomposer comprises an aggregation of a granular porous material.

25. A carbon nanotube manufacturing apparatus according to claim 22, wherein the gas decomposer comprises an aggregation of a granular porous material formed from a metal oxide material and from a carbon material.

26. A carbon nanotube manufacturing apparatus according to claim 22, wherein the synthesizing portion is placed in the vicinity of the gas flow releasing port of the gas supplying pipe.

27. A carbon nanotube manufacturing apparatus according to claim 26, wherein the synthesizing portion comprises one or two or more substrates.

28. A carbon nanotube manufacturing apparatus according to claim 26, wherein at least one of the substrates serving as the synthesizing portion is placed perpendicular to or at an angle to the direction of the flow of the gas released from the releasing port of the gas supplying pipe.

29. A carbon nanotube manufacturing apparatus according to claim 17, wherein a metal catalyst is put in the synthesizing portion.

30. A carbon nanotube manufacturing apparatus according to claim 29, wherein the metal catalyst having a thin film form is put in the synthesizing portion.

31. A carbon nanotube manufacturing apparatus according to claim 17, wherein the synthesizing portion comprises a substrate that is formed from a material containing a metal catalyst.

32. A carbon nanotube manufacturing apparatus according to claim 17, wherein:

the heating unit comprises a heating furnace; and
the reaction tube is placed inside the heating furnace.

* * * * *